(12) United States Patent
Sawahata

(10) Patent No.: US 10,847,108 B2
(45) Date of Patent: Nov. 24, 2020

(54) DISPLAY APPARATUS AND METHOD OF CONTROLLING DISPLAY APPARATUS

(71) Applicant: SAKAI DISPLAY PRODUCTS CORPORATION, Sakai-shi (JP)

(72) Inventor: Junichi Sawahata, Sakai (JP)

(73) Assignee: SAKAI DISPLAY PRODUCTS CORPORATION, Sakai (JP)

(*) Notice: Subject to any disclaimer, the term of this patent is extended or adjusted under 35 U.S.C. 154(b) by 0 days.

(21) Appl. No.: 16/689,903

(22) Filed: Nov. 20, 2019

(65) Prior Publication Data

US 2020/0168172 A1 May 28, 2020

Related U.S. Application Data

(60) Provisional application No. 62/772,270, filed on Nov. 28, 2018.

(51) Int. Cl.
*G09G 3/36* (2006.01)
*G06F 1/324* (2019.01)

(52) U.S. Cl.
CPC ......... *G09G 3/3677* (2013.01); *G09G 3/3688* (2013.01); *G09G 3/3696* (2013.01); *G06F 1/324* (2013.01); *G09G 2310/08* (2013.01); *G09G 2320/0223* (2013.01)

(58) Field of Classification Search
CPC ......... G09G 2320/0223; G09G 3/3677; G09G 2310/08; G09G 2310/0286; G09G 2310/0267; G09G 3/3266; G09G 3/3674; G09G 3/3696; G09G 2310/06–067; G09G 3/3648; G09G 2310/027; G09G 5/18
See application file for complete search history.

(56) References Cited

U.S. PATENT DOCUMENTS

| | | |
|---|---|---|
| 2004/0155850 A1 | 8/2004 | Kida et al. |
| 2007/0262975 A1 | 11/2007 | Kida et al. |

FOREIGN PATENT DOCUMENTS

| | | |
|---|---|---|
| JP | 2003-345457 A | 12/2003 |

*Primary Examiner* — Sanjiv D. Patel
(74) *Attorney, Agent, or Firm* — ScienBiziP, P.C.

(57) ABSTRACT

A display apparatus is disclosed. The display apparatus according to one Embodiment comprises: a plurality of pixels arranged in a matrix; a plurality of scanning lines; a plurality of data lines; a scanning line drive unit to generate a scanning signal for selecting a group of pixels arranged in the row direction based on a scanning clock signal and successively output the generated scanning signal to the plurality of scanning lines; a data line drive unit to output, to a plurality of data lines, data signals for supplying voltages to the group of pixels arranged in the row direction; and a timing control unit to control the drive timing of the scanning line drive unit and the data line drive unit based on a first clock signal, and to generate the scanning clock signal based on the first clock signal.

9 Claims, 8 Drawing Sheets

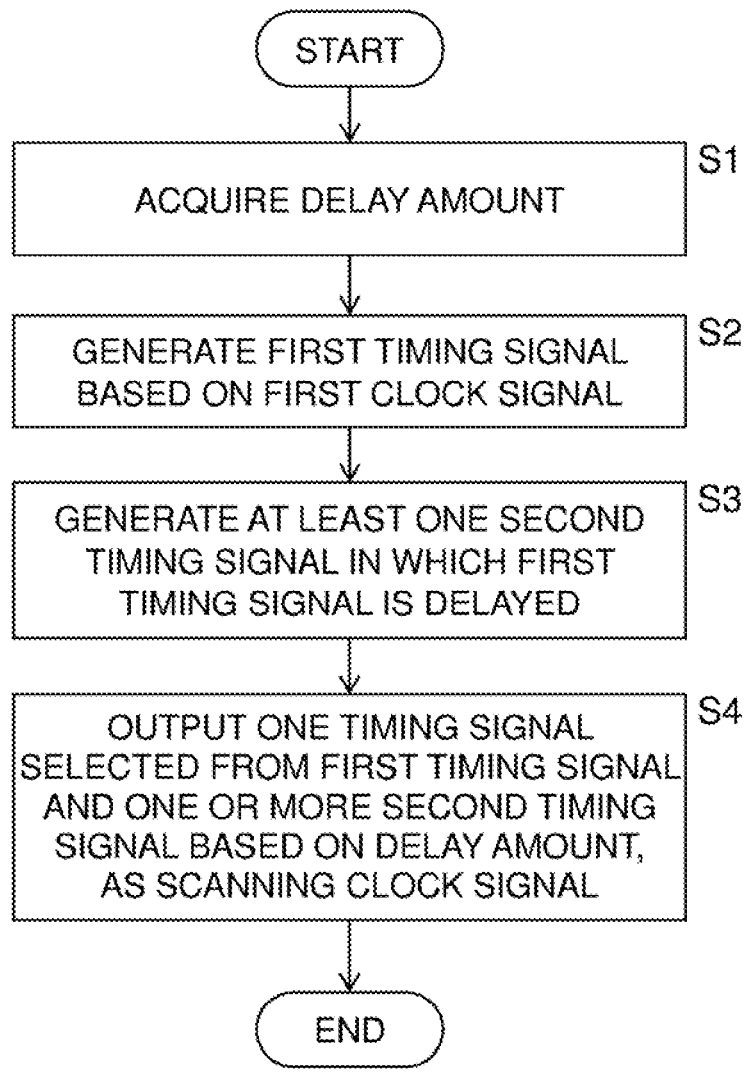

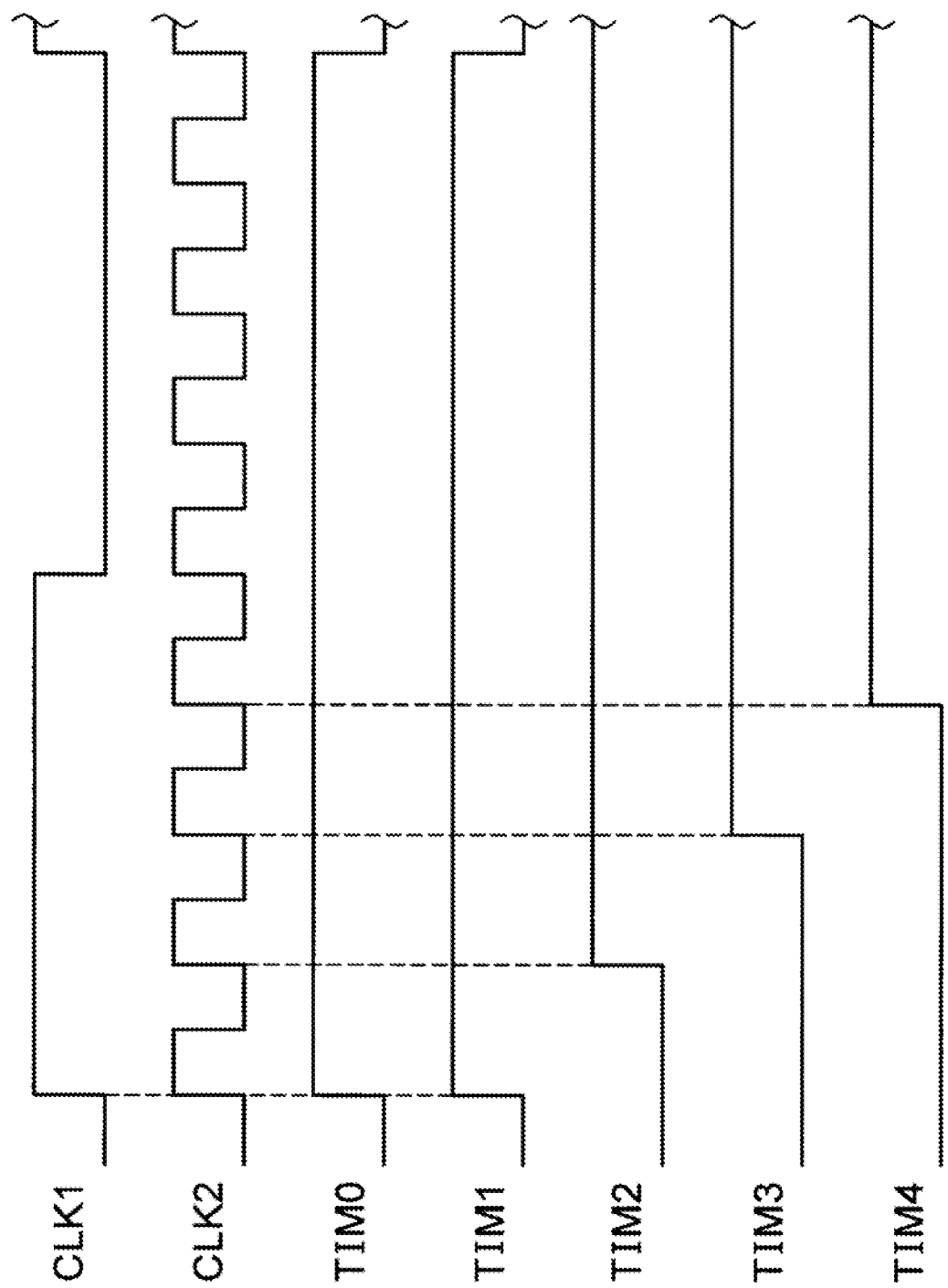

DISPLAY APPARATUS AND METHOD OF CONTROLLING DISPLAY APPARATUS

CROSS-REFERENCE TO RELATED APPLICATIONS

This application claims priority to and the benefit of priority of U.S. Provisional Application No. 62/772,270, filed on Nov. 28, 2018, the entire contents of which are incorporated herein by reference.

BACKGROUND

Technical Field

The present disclosure relates to a display apparatus and a method for controlling a display apparatus.

Description of Related Art

In a display apparatus comprising a liquid crystal display panel in which are arranged, in a matrix, a plurality of data lines on which data signals are transmitted and a plurality of scanning lines on which scanning signals are transmitted, a timing signal for controlling video to be displayed on the display apparatus is generated, for example, by a timing generation device comprising a counter circuit. In such a timing generation device, there is a problem that, in a case the frequency of a clock signal input to the counter circuit is high, the number of bits required for the counter circuit increases, so that consumed power of the timing generation device increases and the operation of the counter circuit becomes unstable.

JP2003-345457A discloses generating an operating clock signal having frequency lower than that of a master clock signal of a timing generation device. Then, a counter circuit is used to generate a plurality of timing signals based on the above-mentioned operating clock signal. This seeks to overcome the above-described problem by decreasing the operating speed of the counter circuit.

However, if the frequency of the operating clock signal is low, a timing signal adjusted in a short time unit cannot be generated. Therefore, for a display apparatus for which a highly-accurate timing signal is required with upsizing of the display area and high resolution of video, it is difficult to apply a timing generation device only operating with a low-frequency operating clock signal.

On the other hand, if one seeks to stably operate a counter circuit with a high-frequency operating clock signal in order to generate a timing signal adjusted in a short time unit, an inexpensive logic IC (integrated circuit) such as a CPLD (complex programmable logic device) cannot be applied, so that, for example, an expensive logic IC such as an FPGA (field programmable gate array) needs to be used. Therefore, the cost of manufacturing the display apparatus increases.

Among timing signals used for the display apparatus, there arises a need especially for adjusting a scanning clock signal in a highly-accurate manner in order to compensate for the difference in transmission delay between the data signals and the scanning signal. However, due to the above-described reasons, it is difficult to generate a highly-accurate scanning clock signal stably and inexpensively with low consumed power.

SUMMARY

A display apparatus according to one Embodiment of the present disclosure comprises: a plurality of pixels arranged in a matrix; a plurality of scanning lines each connected to a group of pixels arranged in a row direction of the plurality of pixels; a plurality of data lines each connected to a group of pixels arranged in a column direction of the plurality of pixels; a scanning line drive unit to generate a scanning signal for selecting the group of pixels arranged in the row direction based on a scanning clock signal and successively output the generated scanning signal to the plurality of scanning lines, wherein the scanning clock signal indicates the drive timing of the plurality of scanning lines; a data line drive unit to output, to the plurality of data lines, data signals for supplying voltages to the group of pixels arranged in the row direction, wherein the group of pixels is selected by the scanning signal, and the voltages are based on video data; and a timing control unit to control the drive timing of the scanning line drive unit and the data line drive unit based on a first clock signal, and to generate the scanning clock signal based on the first clock signal; wherein the timing control unit comprises: a delay amount acquisition unit to acquire a delay amount at the time of level transition of the scanning clock signal relative to the time of level transition of a base timing signal, level transition from a first signal level to a second signal level of which is repeated in synchronization with the first clock signal at a period corresponding to one horizontal scanning period; a first timing generation unit to generate a first timing signal which delays the time of level transition of the base timing signal by a delay corresponding to a period unit of the first clock signal of the delay amount based on the first clock signal; a second timing generation unit to generate at least one second timing signal which delays the time of level transition of the first timing signal by a duration of a period unit of a second clock signal having frequency higher than frequency of the first clock signal; and a selection unit to output one timing signal as the scanning clock signal, wherein the one timing signal is selected from the first timing signal and the at least one second timing signal based on the delay amount.

A method for controlling a display apparatus, according to one Embodiment of the present disclosure, comprises, in a display apparatus comprising: a plurality of pixels arranged in a matrix; a plurality of scanning lines each connected to a group of pixels arranged in a row direction of the plurality of pixels; a plurality of data lines each connected to a group of pixels arranged in a column direction of the plurality of pixels; a scanning line drive unit to generate a scanning signal for selecting the group of pixels arranged in the row direction based on a scanning clock signal and successively output the generated scanning signal to the plurality of scanning lines, wherein the scanning clock signal indicates the drive timing of the plurality of scanning lines; a data line drive unit to output, to the plurality of data lines, data signals for supplying voltages to the group of pixels arranged in the row direction, wherein the group of pixels is selected by the scanning signal, and the voltages are based on video data; and a timing control unit to control the drive timing of the scanning line drive unit and the data line drive unit based on a first clock signal, and to generate the scanning clock signal based on the first clock signal, the method of controlling a display apparatus comprising: acquiring a delay amount at the time of level transition of the scanning clock signal relative to the time of level transition of a base timing signal, level transition from a first signal level to a second signal level of which is repeated in synchronization with the first clock signal at a period corresponding to one horizontal scanning period; generating a first timing signal which delays the time of level transition of the base timing signal by a delay corresponding to a period unit of the first clock signal of the delay amount based on the first clock signal; generating at least one second timing signal which delays the time of level transition of the first timing signal by a duration of a period unit of a second clock signal having frequency higher than frequency of the first clock signal; and outputting one timing signal as the scanning clock signal, wherein the one timing signal is selected from the first timing signal and the at least one second timing signal based on the delay amount.

According to a display apparatus and a method for controlling a display apparatus in an Embodiment of the present disclosure, a scanning clock signal adjusted in a short time unit can be stably obtained even when a low-frequency clock signal is used as a master clock signal, making it possible to reduce consumed power and inexpensively provide a display apparatus with an improved display definition.

BRIEF DESCRIPTION OF THE DRAWINGS

FIG. 6 shows a schematic flowchart of a method for controlling the display apparatus shown in FIG. 1.

FIG. 7B shows a timing chart indicating each signal at the scanning clock signal generation unit shown in FIG. 5.

DETAILED DESCRIPTION

Embodiment 1

Below, Embodiment 1 is described with reference to the drawings. In each of the drawings, the same letter is affixed to portions having the same function.

Configuration of Display Apparatus According to Embodiment 1

Figure 1:
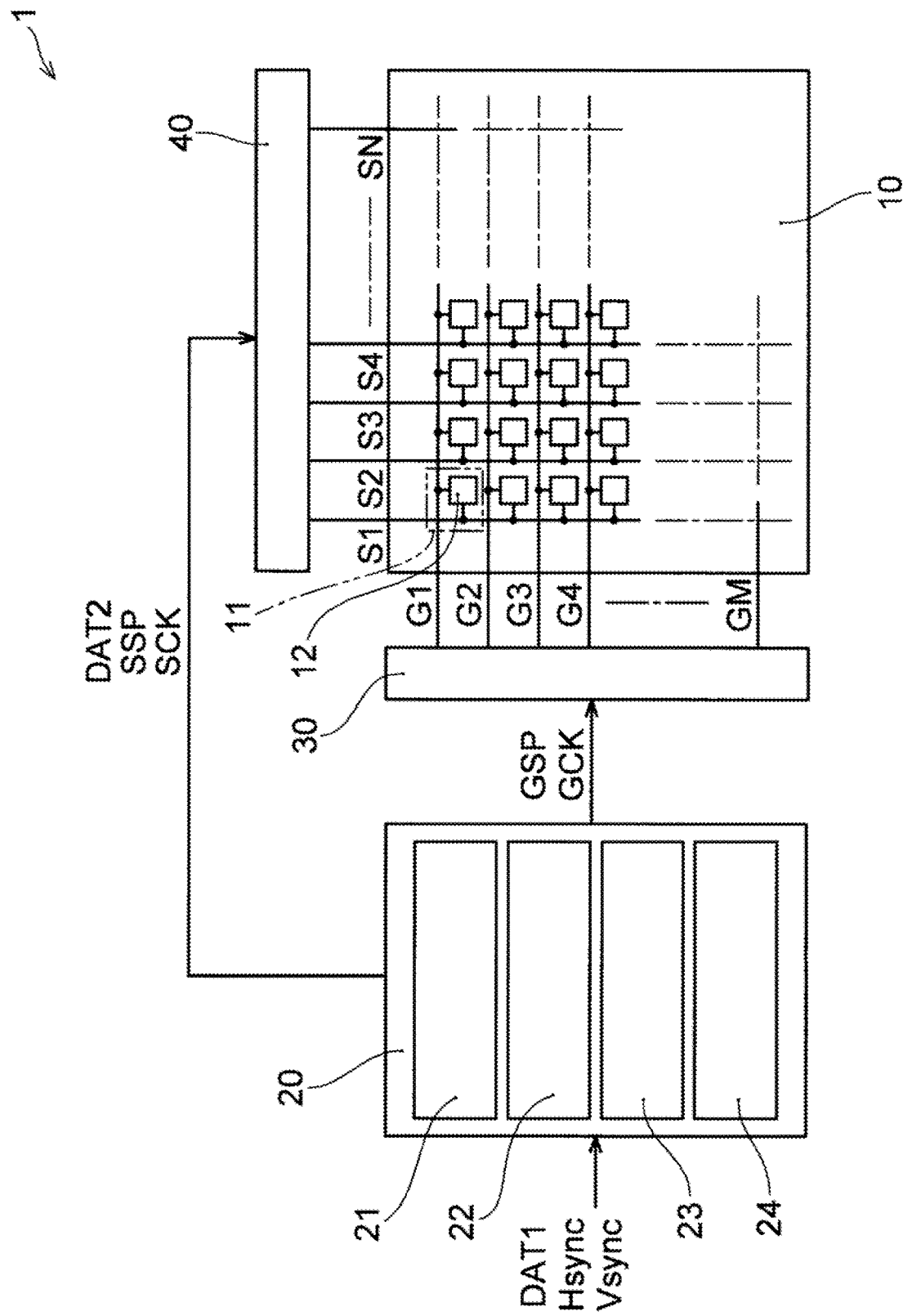
FIG. 1 shows a schematic block diagram of a display apparatus according to Embodiment 1.

FIG. 1 shows a schematic block diagram of a display apparatus 1 according to Embodiment 1. The display apparatus 1 according to the present Embodiment comprises a display panel 10, a timing control unit 20, a scanning line drive unit 30, and a data line drive unit 40.

The display panel 10, comprising, for example, an active matrix-type liquid crystal display panel, or the like, comprises a plurality of pixels 11 arranged in a matrix, the plurality of pixels 11 being arranged in a display area. The display panel 10 comprises scanning lines G1 to G4, . . . , GM connected to a group of pixels arranged in a row direction of the plurality of pixels 11, data lines S1 to S4, . . . , SN connected to a group pf pixels arranged in a column direction of the plurality of pixels 11, and pixel circuits 12, each of which being provided at respectively corresponding intersection of the scanning lines G1 to G4, . . . , GM and the data lines S1 to S4, . . . , SN, etc.

Figure 2:
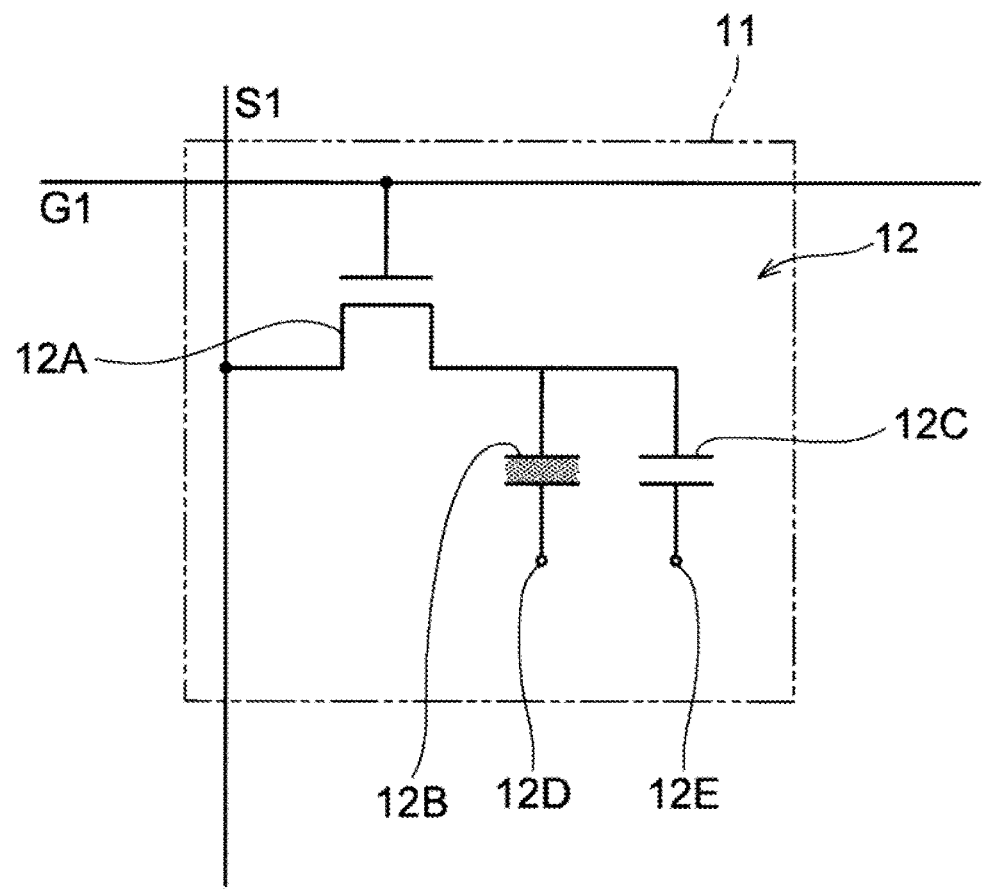
FIG. 2 shows a schematic circuit diagram of an example of a pixel circuit shown in FIG. 1.

FIG. 2 shows a circuit diagram of the pixel circuit 12 in a case that the display panel 10 is a liquid crystal display panel. Here, the circuit diagram is shown with the pixel circuit 12 in correspondence with the intersection of the scanning line G1 and the data line S1 as an example. The pixel circuit 12 comprises a switching element 12A, a liquid crystal capacitance 12B, an auxiliary capacitance 12C, a common electrode 12D, and an auxiliary electrode 12E, etc. While each of the pixels 11 is shown as comprising the one pixel circuit 12 in FIGS. 1 and 2, in practice, the pixel 11 comprises a plurality of subpixels (for example, a subpixel to display red (R), a subpixel to display green (G), and a subpixel to display blue (B)), each of the subpixels comprising the one pixel circuit 12. The display panel 10 is configured to make it possible to display in color by the above-mentioned subpixels displaying different colors.

The switching element 12A comprises, for example, thin-film transistors (TFTs), wherein the gate electrode of the switching element 12A is connected to the scanning line G1 and the source electrode of the switching element 12A is connected to the data line S1, respectively. The liquid crystal capacitance 12B comprises a capacitor in which a liquid crystal is sandwiched by one pair of electrodes, for example, one of the one pair of electrodes is connected to the drain electrode of the switching element 12A and the other one of the one pair of electrodes is connected to the common electrode 12D, respectively. The auxiliary capacitance 12C comprises, for example, a capacitor, one of the one pair of electrodes being connected to the drain electrode of the switching element 12A and the other one of the one pair of electrodes being connected to the auxiliary electrode 12E, respectively.

Returning to FIG. 1, based on a first clock signal CLK1 being a master clock signal, and a vertical synchronization signal Vsync and a horizontal synchronization signal Hsync, the vertical synchronization signal Vsync and the horizontal synchronization signal Hsync being in synchronization with video data DAT1, the video data DAT1 to be input externally, the timing control unit 20 controls the drive timing of the scanning line drive unit 30 and the data line drive unit 40, and generates a plurality of timing signals to be described later. The timing control unit 20 comprises a scanning start signal generation unit 21, a scanning clock signal generation unit 22, a data start signal generation unit 23, and a data clock signal generation unit 24, etc. Moreover, the timing control unit 20 generates video data DAT2 in which a video process such as gamma correction is applied to the video data DAT1.

The scanning start signal generation unit 21 generates a scanning start signal GSP being a timing signal for starting scanning of one frame of the video data DAT2.

For each one horizontal scanning period (below called "1H"), the scanning clock signal generation unit 22 generates a scanning clock signal GCK, the scanning clock signal GCK being a timing signal for outputting a scanning signal pulse from the scanning line drive unit 30 in the order of the plurality of scanning lines G1 to G4, . . . , GM.

For each one 1H, the data start signal generation unit 23 generates, at the data line drive unit 40, a data start signal SSP, the data start signal SSP being a timing signal for starting latching of each of data signals for each of the plurality of data lines S1 to S4, . . . , SN.

The data clock signal generation unit 24 generates a data clock signal SCK being a timing signal for successively latching each of the data signals to the data lines S1 to S4, . . . , SN, in order to simultaneously outputting the data signals for 1H from the data line drive unit 40 to the plurality of data lines S1 to S4, . . . , SN.

The scanning line drive unit 30 generates a scanning signal for selecting a group of pixels arranged in a row direction based on the scanning start signal GSP and the scanning clock signal GCK and successively outputs the generated scanning signals to the plurality of scanning lines G1 to G4, . . . , GM.

Based on the data start signal SSP and the data clock signal SCK, the data line drive unit 40 outputs the data signals for supplying voltages to a group of pixels arranged in a row direction to the plurality of data lines S1 to S4, . . . , SN, respectively, the voltages are based on the video data DAT2, and the group of pixels is selected by a scanning signal. Specifically, the data line drive unit 40 converts the video data DAT2 being input from the timing control unit 20 from a serial digital signal to a plurality of parallel analog signals (the data signals), and outputs the converted plurality of parallel analog signals to the respective plurality of data lines S1 to S4, . . . , SN.

Then, the voltages according to the data signals output to the respective plurality of data lines S1 to S4, . . . , SN is applied to the liquid crystal capacitance 12B and the auxiliary capacitance 12C via the switching element 12A during the selection period in which the switching element 12A comprised in each of the pixel circuits 12 is turned on by the scanning signals output to the respective plurality of scanning lines G1 to G4, . . . , GM. The liquid crystal capacitance 12B and the auxiliary capacitance 12C holds the applied voltage for a certain period to adjust an opening/closing the degree of a liquid crystal shutter. In this way, each of the pixels 11 of the display panel 10 comprising a liquid crystal display panel controls a degree of transmittance of a white color light irradiated from a backlight device (not shown), so that the display panel 10 can display desired video according to the video data DAT1 to be input externally.

Here, the data signals are more susceptible to being influenced by the effect of a wiring resistance or a parasitic capacitance of the display panel 10 than the scanning clock signal GCK indicating the drive timing of the plurality of scanning lines G1 to G4, . . . , GM. Such an effect causes delays in the data signals relative to the scanning signal. This delay causes display unevenness to occur in displaying of the display panel 10. Therefore, according to the present Embodiment, outputting of the scanning signal is delayed relative to outputting of the data signals to suppress display unevenness due to the delay in the data signals relative to each scanning signal. Specifically, the scanning clock signal GCK is delayed.

Figure 3A:
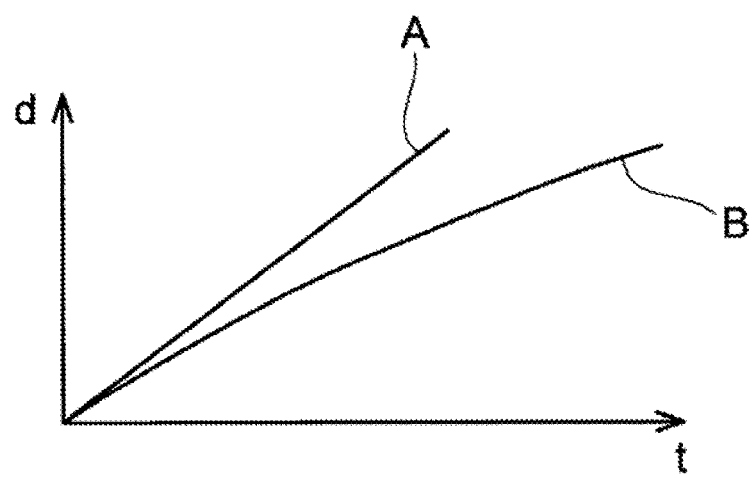
FIG. 3A shows a graph of the transmission property of data signals and a scanning signal in a case of not delaying a scanning clock signal.
Figure 3B:
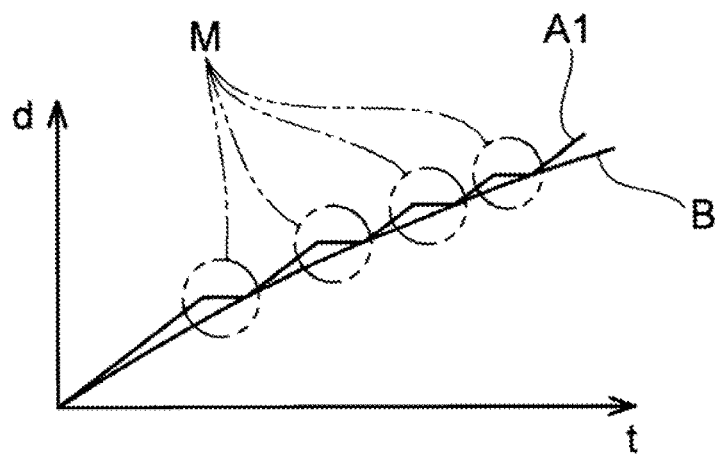
FIG. 3B shows a graph of the transmission property of the data signals and the scanning signal in a case of delaying the scanning clock signal in a relatively long time unit.
Figure 3C:
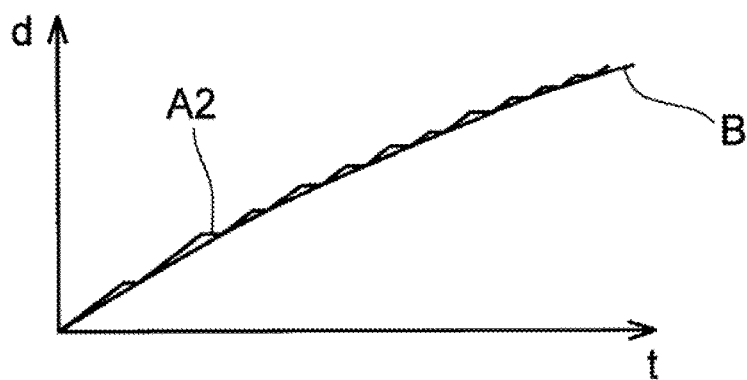
FIG. 3C shows a graph of the transmission property of the data signals and the scanning signal in a case of delaying the scanning clock signal in a short time unit.

FIGS. 3A to 3C show graphs indicating the relationship of a transmission distance d from an input end relative to an elapsed time t from inputting of the data signals and the scanning signal. FIG. 3A shows a graph in a case of not delaying a scanning clock signal. FIG. 3B shows a graph in a case of delaying the scanning clock signal in a relatively long time unit. FIG. 3C shows a graph in a case of delaying the scanning clock signal in a short time unit. Here, the scanning signals corresponding to the transmission properties A, A1, and A2 of the scanning signal are also called the scanning signals A, A1, and A2, respectively. Moreover, the data signals corresponding to the transmission property B of the data signals are also called the data signals B.

As shown in FIG. 3A, the longer the transmission distance d, the larger the delay of the data signals B relative to the scanning signal A. In other words, in FIG. 1, with the scanning line GM being farther from the data line drive unit 40, the larger the delay of the scanning signal relative to the data signals B. This causes the above-described display unevenness to appear. Therefore, the scanning clock signal GCK is delayed such that the delay between each scanning signal A and the data signals B in the pixel circuit 12 is cancelled out in accordance with the transmission distance d from the data line drive unit 40.

Figure 4A:
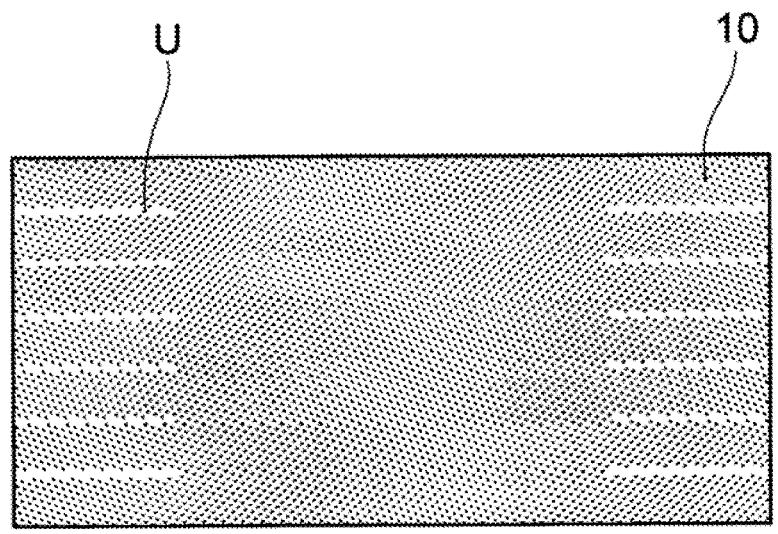
FIG. 4A shows a front view of displaying of a display panel in a case of using the scanning clock signal shown in FIG. 3B.

Here, as shown in FIG. 3B, in a case of delaying the scanning clock signal GCK in a relatively long time unit using a low-frequency clock signal, the transmission property cannot be matched between the data signals B and the scanning signal A1 in a highly-defined manner. Conducting such a delaying process causes an offset M to occur in the transmission property between the data signals B and the scanning signal A1 according to the time unit to be delayed. An increase in the high definition of the display panel shortens the time of 1H, so that the effect of the offset M is noticeably exhibited in displaying of the display panel 10 even when a pulse of the scanning clock signal GCK is delayed by one period of the low-frequency clock signal. For example, with a scanning line GX (where X=1 to M) in which the offset M occurs, the offset M causes the difference in luminance between displaying of the one pixel 11 connected to the scanning line GX and displaying of the one pixel 11 being different from that for displaying of another pixel 11. Therefore, as shown in FIG. 4A, this causes display unevenness U of a stripe shape to be exhibited in displaying of the display panel 10. (FIG. 4A shows a case of displaying a solid image, for example, with a single gray scale of an 80 gradation being low in gray scale, in video data of gray scales with 256 gradations.)

Figure 4B:
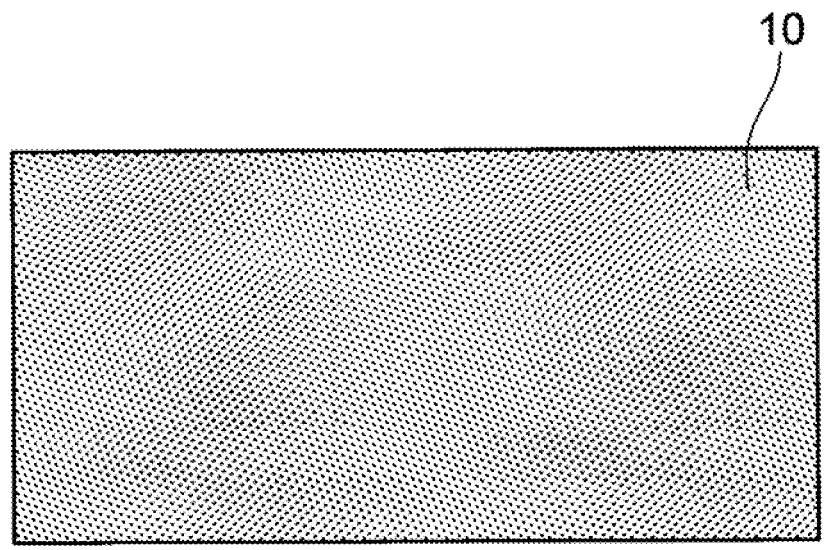
FIG. 4B shows a front view of displaying of the display panel in a case of using the scanning clock signal shown in FIG. 3C.

On the other hand, as shown in FIG. 3C, in a case of delaying the scanning clock signal GCK in a short time unit using a high-frequency clock signal, the transmission timings match in a highly-defined manner between the data signals B and the scanning signal A2. As shown in FIG. 4B, this causes video without display unevenness to be displayed on the display panel 10. (FIG. 4B shows a case of displaying video data in the same manner as in FIG. 4A.)

To compensate for the above-described offset M, the scanning clock signal GCK, the delay amount of which is adjusted in a short time unit, is generated in the present Embodiment. Below, a configuration of the scanning clock signal generation unit 22 to allow adjusting the delay amount in a short time unit is described in detail.

(Configuration of Scanning Clock Signal Generation Unit According to Embodiment 1)

Figure 5:
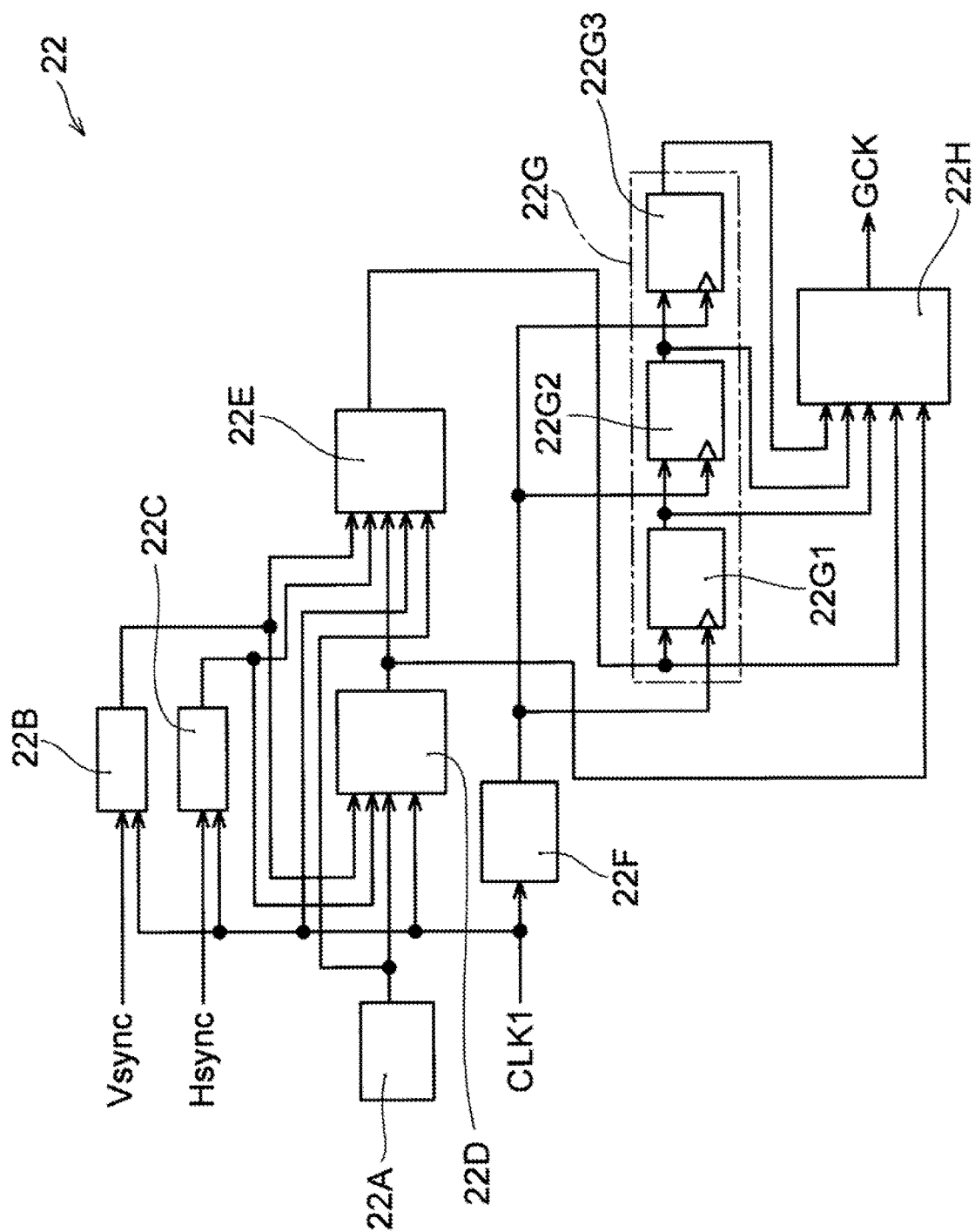
FIG. 5 shows a schematic block diagram of a scanning clock signal generation unit according to Embodiment 1.

FIG. 5 shows a schematic block diagram of the scanning clock signal generation unit 22 according to the present Embodiment. The scanning clock signal generation unit 22, comprising, for example, a logic IC such as a CPLD or an FPGA, comprises a timing storage unit 22A, a vertical counter unit 22B, a horizontal counter unit 22C, a delay amount acquisition unit 22D, a first timing signal generation unit 22E, a multiplication unit 22F, a second timing signal generation unit 22G, and a selection unit 22H. A vertical synchronization signal Vsync, a horizontal synchronization signal Hsync, and a first clock signal CLK1 are externally input into the scanning clock signal generation unit 22. The first clock signal CLK1 is generated, for example, by a crystal oscillator or a voltage-controlled oscillator. In the present Embodiment, the frequency of the first clock signal CLK1 being a master clock signal of the timing control unit 20 is relatively low, so that the CPLD having a low operating frequency and being less expensive than the FPGA is preferably used as the timing control unit 20.

The timing storage unit 22A stores, as pulse data D1, a setting value at the time of level transition from a first signal level to a second signal level with respect to the scanning clock signal GCK before being delayed (below called "a base timing signal TIM0"). Here, the level transition from the first signal level to the second signal level corresponds to, for example, rise or fall of a pulse. In the base timing signal TIM0, the level transition from the first signal level to the second signal level is repeated in synchronization with the first clock signal CLK1 at a period corresponding to 1H.

The vertical counter unit 22B generates a vertical count signal D2 with the first clock signal CLK1 as an operating clock signal, the vertical count signal D2 indicating the number of pulses of the vertical synchronization signal Vsync, and outputs the generated vertical count signal D2 to the delay amount acquisition unit 22D and the first timing signal generation unit 22E.

The horizontal counter unit 22C generates a horizontal count signal D3 with the first clock signal CLK1 as an operating clock signal, the horizontal count signal D3 indicating the number of pulses of the horizontal synchronization signal Hsync, and outputs the generated horizontal count signal D3 to the delay amount acquisition unit 22D and the first timing signal generation unit 22E.

With the first clock signal CLK1 as an operating clock signal, the delay amount acquisition unit 22D calculates a delay amount at the time of level transition of the scanning clock signal GCK (a delay amount corresponding to the delay of the data signals relative to the scanning signal shown in FIG. 3A) relative to the time of level transition of the base timing signal TIM0 from information on the pulse data D1 input from the timing storage unit 22A, the vertical count signal D2 input from the vertical counter unit 22B, and the horizontal count signal D3 input from the horizontal counter unit 22C, and outputs a delay signal D4 indicating the calculated delay amount to the first timing signal generation unit 22E and the selection unit 22H. The delay amount acquisition unit 22D preferably calculates the delay amount at the time of level transition of the scanning clock signal GCK relative to the time of level transition of the base timing signal TIM0 for each of the plurality of scanning lines G1 to G4, . . . , GM. Instead of calculating the delay amount, the delay amount acquisition unit 22D can read a delay amount stored in advance in a storage unit such as the timing storage unit 22A. Below, obtaining a delay amount using a certain technique comprising calculating or reading is called "acquiring a delay amount".

With the first clock signal CLK1 as an operating clock signal, the first timing signal generation unit 22E, comprising a counter circuit, generates a first timing signal TIM1 from information on the pulse data D1 input from the timing storage unit 22A, the vertical count signal D2 input from the vertical counter unit 22B, the horizontal count signal D3 input from the horizontal counter unit 22C, and the delay signal D4 input from the delay amount acquisition unit 22D. Specifically, the first timing signal generation unit 22E generates the first timing signal TIM1 in which the time of level transition of the base timing signal TIM0 is delayed by a delay corresponding to a period unit of the first clock signal CLK1 of a delay amount comprised in the delay signal D4 based on the first clock signal CLK1, and outputs the generated first timing signal TIM1 to the second timing signal generation unit 22G and the selection unit 22H. Here, the "period unit" refers to a time unit in which the time corresponding to one period of a signal is multiplied by n, where n is a natural number. Specifically, the first timing signal generation unit 22E delays the time of level transition in the base timing signal TIM0, which time indicates the drive timing of a certain scanning line GX (where X=1 to M), by the delay corresponding to the period unit of the first clock signal CLK1 of the delay amount for the above-mentioned scanning line GX to generate the first timing signal TIM1.

The multiplication unit 22F, comprising, for example, a multiplication element such as a Phase Locked Loop (PLL) element, generates, based on the first clock signal CLK1, a second clock signal CLK2 in which the first clock signal CLK1 is multiplied and outputs the generated second clock signal CLK2 to the second timing signal generation unit 22G.

The second timing signal generation unit 22G, comprising, for example, serially-connected multi-stage delay elements 22G1-22G3, etc., generates a plurality of second timing signals TIM2-4 in which the time of level transition of the first timing signal TIM1 is delayed by the duration of the period unit of the second clock signal CLK2. Each of the delay elements 22G1-22G3 comprises, for example, a D-type flip-flop (D-FF), etc. Each of the delay elements 22G 1-22G3 outputs a signal delayed by the duration of the period unit of the clock signal CLK2 relative to the input. Specifically, for example, in a case that each of the delay elements 22G 1-22G3 outputs a signal delayed by the duration of one period unit of the second clock signal CLK2, the delay element 22G 1 generates a second timing signal TIM2 in which the first timing signal TIM1 is delayed by one period of the second clock signal CLK2, the delay element 22G2 generates a second timing signal TIM3 in which the second timing signal TIM2 is delayed by one period of the second clock signal CLK2, and the delay element 22G3 generates a second timing signal TIM4 in which the second timing signal TIM3 is delayed by one period of the second clock signal CLK2.

Based on the delay signal D4 input from the delay amount acquisition unit 22D, the selection unit 22H, comprising, for example, a multiplexer, etc., sets one timing signal as the scanning clock signal GCK and outputs the scanning clock signal GCK to the scanning line drive unit 30 shown in FIG. 1, the one timing signal being selected from the first timing signal TIM1 input from the first timing signal generation unit 22E and the second timing signals TIM2-4 input from the second timing signal generation unit 22G. Specifically, the selection unit 22H outputs one timing signal as a signal indicating the drive timing for the scanning line GX in the scanning clock signal GCK, the one timing signal being selected based on the delay amount for the scanning line GX.

It should be noted that FIG. 5 merely shows, only as one example, a case in which the second timing signal generation unit 22G uses three delay elements 22G1-22G3 to generate three second timing signals TIM2-4, so that it does not limit the present Embodiment thereto. In the present Embodiment, it suffices that the number of delay elements in the second timing signal generation unit 22G be at least one. In this case, with the number of the second timing signals generated being brought to the number identical to the number of delay elements, the selection unit 22H selects one timing signal from the first timing signal TIM1 and the second timing signals, the number of which second timing signals being identical to that of delay elements, and outputs the selected signal as the scanning clock signal GCK to the scanning line drive unit 30.

Method of Controlling Display Apparatus
According to Embodiment 1

Figure 7A:
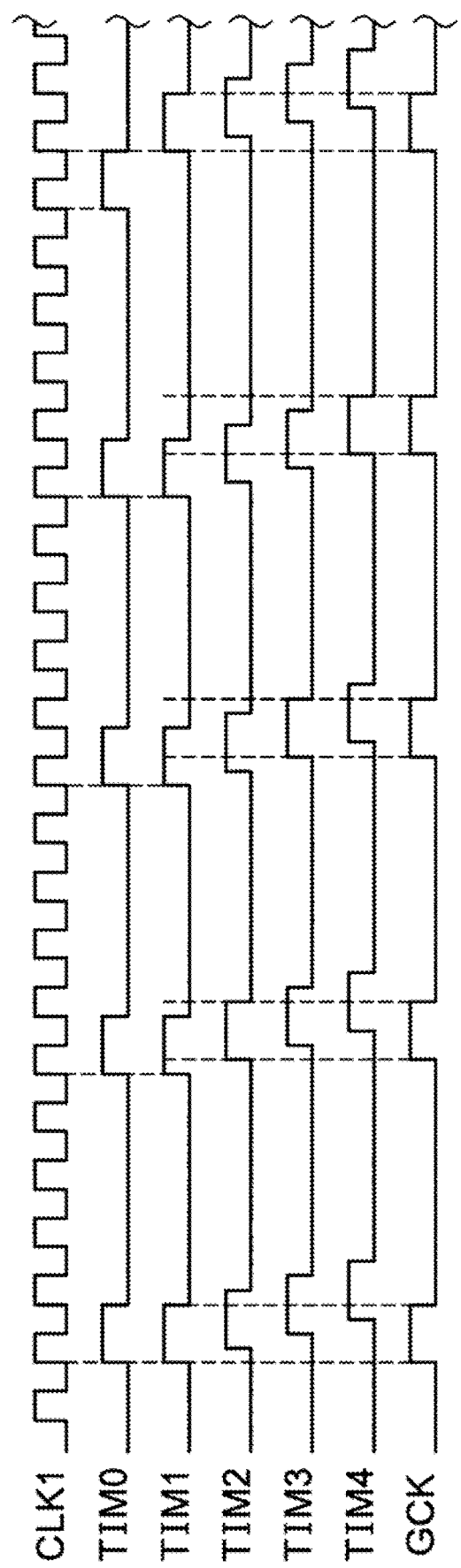
FIG. 7A shows a timing chart indicating each signal at the scanning clock signal generation unit shown in FIG. 5.

A method of controlling the display apparatus 1 comprising the above-described scanning clock signal generation unit 22 will be described below with reference to FIGS. 6, 7A, and 7B, etc. FIG. 6 shows a schematic flowchart of the method for controlling the display apparatus 1 shown in FIG. 1. FIGS. 7A and 7B show timing charts indicating each signal at the scanning clock signal generation unit 22 shown in FIG. 5.

First, the delay amount acquisition unit 22D acquires a delay amount at the time of level transition of the scanning clock signal GCK relative to the time of level transition of the base timing signal TIM0 (step S1 in FIG. 6). Specifically, first the delay amount acquisition unit 22D specifies the position within one frame of the video data DAT2 from information on the vertical count signal D2 input from the vertical counter unit 22B and the horizontal count signal D3 input from the horizontal counter unit 22C, and further specifies the scanning line GX (where X=1 to M) corresponding to the data signals output from the data line drive unit 40. Next, the delay amount acquisition unit 22D calculates a delay amount for compensating the delay of the data signals relative to a scanning signal GoutX output to the specified scanning line GX. The delay amount is preferably calculated from the relationship between the data signals B and the scanning signal A shown in FIG. 3A for each of times of level transition of the base timing signal TIM0 (for example, here, rise times of the base timing signal TIM0) from information on the base timing signal TIM0, the information being comprised in the pulse data D1 input from the timing storage unit 22. Moreover, for example, as described above, the delay amount can be acquired via other techniques such as reading the delay amount stored in advance in the storage unit of the timing storage unit 22A.

Next, based on the first clock signal CLK1, the first timing generation unit 22E generates the first timing signal TIM1 in which the time of level transition of the base timing signal TM0 is delayed by a delay corresponding to the period unit of the first clock signal CLK1 of the delay amount based on the first clock signal CLK1 (step S2 in FIG. 6). For example, from information obtained by rounding less significant bits of the delay signal D4 input from the delay amount acquisition unit 22D (information indicating the delay corresponding to the period unit of the first clock signal CLK1 of the delay amount), the first timing generation unit 22E delays the base timing signal TIM0 in one period unit from the time of level transition of the first clock signal CLK1 to the time of next level transition of the first clock signal CLK1 (here, from the time of rise to the time of next rise of the first clock signal CLK1) as shown in FIG. 7A to generate the first timing signal TIM0. Here, for example, in a case that the delay signal D4 has 8 bits, 2 bits of which are subjected to rounding, the rounding is performed by setting the less significant 2 bits to "00" and making the delay signal D4 "XXXXXX00". In other words, the first timing signal generation unit 22E operating with the low-frequency first clock signal CLK1 cannot adjust the short time-unit delay amount, so that the less significant bits not required as information for the delay signal D4 are rounded. In the example in FIG. 7A, the first timing signal TIM1 is delayed by one period of the first clock signal CLK1 relative to the base timing signal TIM0 with the time of rise of the pulse of the first clock signal CLK1 as a reference.

Next, the second timing signal generation unit 22G generates the at least one second timing signal TIM2-4 in which the time of level transition of the first timing signal TIM1 is delayed by the duration of the period unit of the second clock signal CLK2 (step S3 in FIG. 6). Specifically, for example, the second timing signal generation unit 22G delays the first timing signal TIM1 in one period unit from the time of level transition of the second clock signal CLK2 in which the first clock signal CLK 1 is multiplied in the multiplication unit 22F to the time of next level transition (here, from the time of rise to the time of next rise of the second clock signal CLK2) to generate the plurality of second timing signals TIM2-4 shown in FIG. 7B.

In the example in FIG. 7B, the multiplication unit 22F multiplies the first clock signal CLK1 by 4 to generate the second clock signal CLK2. Then, with the time of rise of the pulse of the second clock signal CLK2 as the starting point, the first-stage delay element 22G1 of the serially-connected delay elements 22G1-22G3 generates the second timing signal TIM2 in which the first timing signal TIM1 input from the first timing signal generation unit 22E is delayed by one period of the second clock signal CLK2, and outputs the second timing signal TIM2 to the second-stage delay element 22G2 and the selection unit 22H. Moreover, with the time of rise of the pulse of the second clock signal CLK2 as the starting point, the second-stage delay element 22G2 generates the second timing signal TIM3 in which the second timing signal TIM2 input from the first-stage delay element 22G1 is delayed by one period of the second clock signal CLK2, and outputs the second timing signal TIM3 to the third-stage delay element 22G3 and the selection unit 22H. Furthermore, with the time of rise of the pulse of the second clock signal CLK2 as the starting point, the third-stage delay element 22G3 generates the second timing signal TIM4 in which the second timing signal TIM3 input from the second-stage delay element 22G2 is delayed by one period of the second clock signal CLK2, and outputs the second timing signal TIM4 to the selection unit 22H.

In other words, in the example in FIG. 7B, the delay amounts of the second timing signals TIM2-4 relative to the first timing signal TIM1 are set to correspond to one period, two periods, and three periods of the second clock signal, which are time units shorter than the delay amount of the first timing signal TIM1 relative to the base timing signal TIM0. In this way, with the time of rise of the pulse of the second clock signal CLK 2 as the starting point, the second timing signal generation unit 22G operating with the high-frequency second clock signal CLK2 can adjust the second timing signals TIM2-4 by the delay amount based on the time units shorter than that of first timing signal generation unit 22E.

Finally, the selection unit 22H outputs one timing signal as the scanning clock signal GCK based on the delay amount, wherein the one timing signal is selected from the first timing signal TIM1 and at least one second timing signal TIM2-4 (step S4 in FIG. 6). Specifically, the selection unit 22H outputs the scanning clock signal GCK shown in FIG. 7A based on information on the less significant bits of the delay signal D4. For example, the first timing signal TIM1 is selected in a case that the less significant bits are "00", the second timing signal TIM2 is selected in a case that the less significant bit are "01", the second timing signal TIM3 is selected in a case that the less significant bits are "10", the second timing signal TIM4 is selected in a case the less significant bits are "11", and the selected signal is output as the scanning clock signal GCK. In this way, the selection unit 22H selects the first and second timing signals TIM1-4 in which the delay amount at the time of level transition of the scanning clock signal GCK relative to the time of level transition of the base timing signal TIM0 is adjusted for each of the plurality of scanning lines G1-G4, . . . , GM, and outputs the selected results. As a result, the scanning clock signal shown in FIG. 7A is obtained.

It should be noted that the timing chart shown in FIG. 7A merely shows, as only one example, a case in which the scanning clock signal GCK is output such that the delay amount at the time of level transition of the scanning clock signal GCK relative to the time of level transition of the base timing signal TIM0 changes for each of the scanning lines G1-G4, . . . , GM, so that it does not limit the present Embodiment thereto. The change in the delay amount can occur every n lines, where n is a natural number, for the scanning lines G1-G4, . . . , GM. For example, taking a case in which the delay amount is changed every 2 lines as an example, the delay amounts of the scanning clock signals GCK indicating the drive timings of the scanning line G1 and G2 are brought to be identical, and the delay amounts of the scanning clock signals GCK indicating the drive timings of the scanning line G3 and G4 are brought to be identical. The delay amount acquisition unit 22D can acquire the delay amount for each scanning line by the value of "n" as described above input from the timing storage unit 22A, etc.

According to the display apparatus 1 and the method of controlling the display apparatus 1 of the present Embodiment thus configured, first the first timing signal generation unit 22E sets the first clock signal CLK1 with relatively low frequency as a master clock signal and generates the first timing signal TM1, in which the delay amount is adjusted in a relatively long time unit, at the timing of the first clock signal CLK1. Thereafter, the second timing signal generation unit 22G generates the second clock signals TIM2-4 at the timing of the second clock signal CLK2 with frequency higher than that of the first clock signal CLK1. Then, the selection unit 22H outputs one timing signal as the scanning clock signal GCK, wherein the one timing signal is selected from the first and second timing signals TIM1-4 based on the delay amount.

Therefore, the first clock signal CLK1 is used as a master clock signal of the scanning clock signal generation unit 22 to keep the frequency of the master clock signal low. In this way, the number of bits required for the counter circuit of the scanning clock signal generation unit 22 decreases, making it possible to stably operate the scanning clock signal generation unit 22 with low consumed power. Moreover, an inexpensive logic IC such as a CPLD operating only at relatively low operating frequency can be applied as the scanning clock signal generation unit 22, making it possible to inexpensively provide the display apparatus 1.

Furthermore, the scanning clock signal GCK is output by selecting from the first timing signal TIM1, and the second timing signals TIM2-4 in which the first timing signal TIM1 is delayed in a short time unit, so that, even when the low-frequency first clock signal is used as a master clock signal, the scanning clock signal GCK is adjusted in a short time unit. This makes it possible to obtain a display apparatus with improved display quality.

Other Embodiments

While the selection unit 22H outputs the scanning clock signal GCK based on the signal of the less significant 2 bits of the delay signal D4 in the above-described Embodiment, the number of less significant bits referred to is not limited to 2 bits. For example, in a case that the number of less significant bits referred to is n bits, the multiplication number in the multiplication unit 22F and the total number of signals for the first and second timing signals TIM1, . . . are preferably set to be the same as the number of states ($2^n$) represented by the less significant bits. In this way, the second clock signal CLK2 and the delay elements 22G1, . . . configuring the second timing signal generation unit 22G will be effectively utilized in generating the second timing signals TIM 1, . . . . It should be noted that the selection unit 22H can select one timing signal based on the entire information indicated by the delay signal D4.

Moreover, while the scanning clock signal generation unit 22 makes shared use of the first clock signal CLK1 being a master clock signal with the timing control unit 20 in the above-described Embodiments, the first clock signal CLK1 can be a master clock signal only for the scanning clock signal generation unit 22.

Furthermore, while the above-described Embodiment provide with a liquid crystal display apparatus as an example, the present disclosure is not limited thereto, so that the present disclosure can be applied to other display apparatuses, for example, such as an organic-EL display panel, etc.

While Embodiments of the present disclosure have been described in the above, the present disclosure is not limited to the above-described Embodiments, so that various variations can be performed thereto within the scope not departing from the spirit of the present disclosure. Moreover, it should be noted that the above-described Embodiments do not limit the invention recited in the claims.

SUMMARY

A display apparatus according to Aspect 1 of the present disclosure comprising: a plurality of pixels arranged in a matrix; a plurality of scanning lines each connected to a group of pixels arranged in a row direction of the plurality of pixels; a plurality of data lines each connected to a group of pixels arranged in a column direction of the plurality of pixels; a scanning line drive unit to generate a scanning signal for selecting the group of pixels arranged in the row direction based on a scanning clock signal and successively output the generated scanning signal to the plurality of scanning lines, wherein the scanning clock signal indicates the drive timing of the plurality of scanning lines; a data line drive unit to output, to the plurality of data lines, data signals for supplying voltages to the group of pixels arranged in the row direction, wherein the group of pixels is selected by the scanning signal, and the voltages are based on video data; and a timing control unit to control the drive timing of the scanning line drive unit and the data line drive unit based on a first clock signal, and to generate the scanning clock signal based on the first clock signal; wherein the timing control unit comprises: a delay amount acquisition unit to acquire a delay amount at the time of level transition of the scanning clock signal relative to the time of level transition of a base timing signal, level transition from a first signal level to a second signal level of which is repeated in synchronization with the first clock signal at a period corresponding to one horizontal scanning period; a first timing generation unit to generate a first timing signal which delays the time of level transition of the base timing signal by a delay corresponding to a period unit of the first clock signal of the delay amount based on the first clock signal; a second timing generation unit to generate at least one second timing signal which delays the time of level transition of the first timing signal by a duration of a period unit of a second clock signal having frequency higher than frequency of the first clock signal; and a selection unit to output one timing signal as the scanning clock signal, wherein the one timing signal is selected from the first timing signal and the at least one second timing signal based on the delay amount.

The configuration according to Aspect 1 of the present disclosure sets the first clock signal having low frequency to be a master clock signal to allow the display apparatus to operate stably. Moreover, the second timing signal is delayed by a duration of a short period unit of the second clock signal having high frequency, which is set to be one option for the scanning clock signal. Thus, even when the first clock signal having low frequency is used as the master clock signal, the scanning clock signal can be delayed in a short time unit. This makes it possible to reduce consumed power and inexpensively provide a display apparatus with improved display quality.

In a display apparatus according to Aspect 2 of the present disclosure, in the above-mentioned Aspect 1 preferably, the delay amount acquisition unit acquires the delay amount for each of the plurality of scanning lines, the first timing signal generation unit delays the time of level transition indicating the drive timing of one scanning line in the base timing signal by a delay corresponding to the period unit of the first clock signal of the delay amount for the one scanning line to generate the first timing signal, and the selection unit outputs the one timing signal selected based on the delay amount for the one scanning line as a signal indicating the drive timing of the one scanning line in the scanning clock signal.

According to the configuration of Aspect 2 of the present disclosure, the delay amount for each of the scanning lines is reflected on the delay amount of the signal indicating the drive timing of each scanning line in the scanning clock signal, allowing the display definition of the display apparatus to further improve.

A display apparatus according to Aspect 3 of the present disclosure, in the above-mentioned Aspect 1 or 2, preferably further comprising a multiplication unit to multiply the first clock signal to generate the second clock signal.

The configuration according to Aspect 3 of the present disclosure makes it possible to easily generate a high-frequency second clock signal.

In a display apparatus according to Aspect 4 of the present disclosure, in any one of Aspects 1 to 3 preferably, the second timing signal generation unit comprises a serially-connected plurality of delay elements, and the at least one second timing signal comprises a plurality of second timing signals and the plurality of second timing signals respectively generated by the plurality of delay elements are input into the selection unit.

The configuration according to Aspect 4 of the present disclosure makes it possible to easily generate the plurality of second timing signals.

In a display apparatus according to Aspect 5 of the present disclosure, in the above-mentioned Aspect 4, preferably, the plurality of delay elements respectively delay signals input into the plurality of delay elements by one period of the second clock signal.

In the configuration according to Aspect 5 of the present disclosure, the second timing signal can be generated in a short time unit, making it possible to also generate the scanning clock signal in a short time unit.

In a display apparatus according to Aspect 6 of the present disclosure, in any one of Aspects 1 to 5, preferably, the first timing signal generation unit delays the base timing signal based on information obtained by rounding at least one less significant bit of information on the delay amount to generate the first timing signal.

The configuration according to Aspect 6 of the present disclosure makes it possible to extract only information on the delay signal required for adjusting the delay amount in the first timing signal generation unit to efficiently generate the first timing signal.

In a display apparatus according to Aspect 7 of the present disclosure, in the above-mentioned Aspect 6, preferably, the selection unit selects the one timing signal based on information on the at least one less significant bit.

The configuration according to Aspect 7 of the present disclosure makes it possible to extract only information on the delay signal required for selecting a signal in the selection unit to efficiently output the scanning clock signal.

A display apparatus according to Aspect 8 of the present disclosure, in any one of Aspects 1 to 7, preferably further comprising a horizontal counter unit and a vertical counter unit to respectively count the number of pulses of a horizontal synchronization signal and a vertical synchronization signal being in synchronization with video data corresponding to video to be displayed on a display panel comprising the plurality of pixels, wherein the delay amount acquisition unit acquires the delay amount based on the number of pulses of the horizontal synchronization signal and the vertical synchronization signal.

The configuration according to Aspect 8 of the present disclosure makes it possible to accurately calculate the delay amount of the scanning signal to be output to the scanning line.

In a method of controlling a display apparatus according to Aspect 9 of the present disclosure, the display apparatus comprising: a plurality of pixels arranged in a matrix; a plurality of scanning lines each connected to a group of pixels arranged in a row direction of the plurality of pixels; a plurality of data lines each connected to a group of pixels arranged in a column direction of the plurality of pixels; a scanning line drive unit to generate a scanning signal for selecting the group of pixels arranged in the row direction based on a scanning clock signal and successively output the generated scanning signal to the plurality of scanning lines, wherein the scanning clock signal indicates the drive timing of the plurality of scanning lines; a data line drive unit to output, to the plurality of data lines, data signals for supplying voltages to the group of pixels arranged in the row direction, wherein the group of pixels is selected by the scanning signal, and the voltages are based on video data; and a timing control unit to control the drive timing of the scanning line drive unit and the data line drive unit based on a first clock signal, and to generate the scanning clock signal based on the first clock signal, the method of controlling a display apparatus comprising: acquiring a delay amount at the time of level transition of the scanning clock signal relative to the time of level transition of a base timing signal, level transition from a first signal level to a second signal level of which is repeated in synchronization with the first clock signal at a period corresponding to one horizontal scanning period; generating a first timing signal which delays the time of level transition of the base timing signal by a delay corresponding to a period unit of the first clock signal of the delay amount based on the first clock signal; generating at least one second timing signal which delays the time of level transition of the first timing signal by a duration of a period unit of a second clock signal having frequency higher than frequency of the first clock signal; and outputting one timing signal as the scanning clock signal, wherein the one timing signal is selected from the first timing signal and the at least one second timing signal based on the delay amount.

The configuration according to Aspect 9 of the present disclosure sets the first clock signal having low frequency to be a master clock signal to allow the display apparatus to operate stably. Moreover, the second timing signal is delayed by a duration of a short time period unit of the second clock signal having high frequency, which is set to be one option for the scanning clock signal. Thus, even when the first clock signal having low frequency is used as the master clock signal, the scanning clock signal can be delayed in a short time unit. This makes it possible to reduce consumed power and inexpensively provide a display apparatus with improved display definition.

What is claimed is:

1. A display apparatus, comprising:
a plurality of pixels arranged in a matrix;
a plurality of scanning lines each connected to a group of pixels arranged in a row direction of the plurality of pixels;
a plurality of data lines each connected to a group of pixels arranged in a column direction of the plurality of pixels;
a scanning line drive unit to generate a scanning signal for selecting the group of pixels arranged in the row direction based on a scanning clock signal and successively output the generated scanning signal to the plurality of scanning lines, wherein the scanning clock signal indicates the drive timing of the plurality of scanning lines;
a data line drive unit to output, to the plurality of data lines, data signals for supplying voltages to the group of pixels arranged in the row direction, wherein the group of pixels is selected by the scanning signal, and the voltages are based on video data; and
a timing control unit to control the drive timing of the scanning line drive unit and the data line drive unit based on a first clock signal, and to generate the scanning clock signal based on the first clock signal;
wherein the timing control unit comprises:
a delay amount acquisition unit to acquire a delay amount at the time of level transition of the scanning clock signal relative to the time of level transition of a base timing signal, level transition from a first signal level to a second signal level of which is repeated in synchronization with the first clock signal at a period corresponding to one horizontal scanning period;
a first timing generation unit to generate a first timing signal which delays the time of level transition of the base timing signal by a delay corresponding to a period unit of the first clock signal of the delay amount based on the first clock signal;
a second timing generation unit to generate at least one second timing signal which delays the time of level transition of the first timing signal by a duration of a period unit of a second clock signal having frequency higher than frequency of the first clock signal; and
a selection unit to output one timing signal as the scanning clock signal, wherein the one timing signal is selected from the first timing signal and the at least one second timing signal based on the delay amount.

2. The display apparatus according to claim 1, wherein the delay amount acquisition unit acquires the delay amount for each of the plurality of scanning lines, the first timing signal generation unit delays the time of level transition indicating the drive timing of one scanning line in the base timing signal by a delay corresponding to the period unit of the first clock signal of the delay amount for the one scanning line to generate the first timing signal, and
the selection unit outputs the one timing signal selected based on the delay amount for the one scanning line as a signal indicating the drive timing of the one scanning line in the scanning clock signal.

3. The display apparatus according to claim 1, further comprising a multiplication unit to multiply the first clock signal to generate the second clock signal.

4. The display apparatus according to claim 1, wherein the second timing signal generation unit comprises a serially-connected plurality of delay elements, and
the at least one second timing signal comprises a plurality of second timing signals and the plurality of second timing signals respectively generated by the plurality of delay elements are input into the selection unit.

5. The display apparatus according to claim 4, wherein the plurality of delay elements respectively delay signals input into the plurality of delay elements by one period of the second clock signal.

6. The display apparatus according to claim 1, wherein the first timing signal generation unit delays the base timing signal based on information obtained by rounding at least one less significant bit of information on the delay amount to generate the first timing signal.

7. The display apparatus according to claim 6, wherein the selection unit selects the one timing signal based on information on the at least one less significant bit.

8. The display apparatus according to claim 1, further comprising a horizontal counter unit and a vertical counter unit to respectively count the number of pulses of a horizontal synchronization signal and a vertical synchronization signal being in synchronization with video data corresponding to video to be displayed on a display panel comprising the plurality of pixels,
wherein the delay amount acquisition unit acquires the delay amount based on the number of pulses of the horizontal synchronization signal and the vertical synchronization signal.

9. A method of controlling a display apparatus, the display apparatus comprising: a plurality of pixels arranged in a matrix; a plurality of scanning lines each connected to a group of pixels arranged in a row direction of the plurality of pixels; a plurality of data lines each connected to a group of pixels arranged in a column direction of the plurality of pixels; a scanning line drive unit to generate a scanning signal for selecting the group of pixels arranged in the row direction based on a scanning clock signal and successively output the generated scanning signal to the plurality of scanning lines, wherein the scanning clock signal indicates the drive timing of the plurality of scanning lines; a data line drive unit to output, to the plurality of data lines, data signals for supplying voltages to the group of pixels arranged in the row direction, wherein the group of pixels is selected by the scanning signal, and the voltages are based on video data; and a timing control unit to control the drive timing of the scanning line drive unit and the data line drive unit based on a first clock signal, and to generate the scanning clock signal based on the first clock signal, the method of controlling a display apparatus comprising:
acquiring a delay amount at the time of level transition of the scanning clock signal relative to the time of level transition of a base timing signal, level transition from a first signal level to a second signal level of which is repeated in synchronization with the first clock signal at a period corresponding to one horizontal scanning period;

generating a first timing signal which delays the time of level transition of the base timing signal by a delay corresponding to a period unit of the first clock signal of the delay amount based on the first clock signal;

generating at least one second timing signal which delays the time of level transition of the first timing signal by a duration of a period unit of a second clock signal having frequency higher than frequency of the first clock signal; and outputting one timing signal as the scanning clock signal, wherein the one timing signal is selected from the first timing signal and the at least one second timing signal based on the delay amount.

* * * * *